United States Patent
Shepstone et al.

(10) Patent No.: US 12,333,429 B2
(45) Date of Patent: Jun. 17, 2025

(54) PARTIAL INFERENCE FRAMEWORK FOR SEQUENTIAL DNN PROCESSING ON CONSTRAINED DEVICES, AND ACOUSTIC SCENE CLASSIFICATION USING SAID PARTIAL INFERENCE FRAMEWORK

(71) Applicant: BANG & OLUFSEN A/S, Struer (DK)

(72) Inventors: Sven Ewan Shepstone, Struer (DK); Pablo Martínez Nuevo, Fredriksberg (DK)

(73) Assignee: Bang & Olufsen A/S, Struer (DK)

( * ) Notice: Subject to any disclaimer, the term of this patent is extended or adjusted under 35 U.S.C. 154(b) by 902 days.

(21) Appl. No.: 17/514,107

(22) Filed: Oct. 29, 2021

(65) Prior Publication Data
US 2022/0138571 A1    May 5, 2022

(51) Int. Cl.
G06N 3/08    (2023.01)
G06N 3/04    (2023.01)
G10L 25/30    (2013.01)
G10L 25/51    (2013.01)

(52) U.S. Cl.
CPC .......... *G06N 3/08* (2013.01); *G06N 3/04* (2013.01); *G10L 25/30* (2013.01); *G10L 25/51* (2013.01)

(58) Field of Classification Search
CPC ........ G06N 3/082; G06N 3/084; G06N 3/086; G06N 3/088; G06N 3/04
See application file for complete search history.

(56) References Cited

U.S. PATENT DOCUMENTS 11,610,435 B2 *   3/2023   Karras .............. G06V 10/7747

FOREIGN PATENT DOCUMENTS

CN    107885464 A    4/2018
EP    3104309 A2    12/2016

OTHER PUBLICATIONS

"Hidayetoglu et al., At-Scale Sparse Deep Neural Network Inference With Efficient GPU Implementation, IEEE" (Year: 2020) (Year: 2020).*
"Antonini et al. , Smart Audio Sensors in the Internet of Things Edge for Anomaly Detection, IEEE" (Year: 2018) (Year: 2018).*
"Wang et al., SparseDNN: Fast Sparse Deep Learning Inference on CPUs," (Year: 2021) (Year: 2021).*

(Continued)

*Primary Examiner* — Alan Chen
(74) *Attorney, Agent, or Firm* — Harness, Dickey & Pierce, P.L.C.; Anthony G. Fussner

(57) ABSTRACT

The present disclosure relates to a method for performing inference on input data using a neural network and a processing device employing the aforementioned method. The method comprises the steps of obtaining and storing input data, obtaining parameter data indicating the parameters of the first layer and storing the parameter data in a parameter data storage location and processing the input data using the first layer parameter data, to form first layer output data. The method further comprises storing the first layer output data, obtaining parameter data of the second layer and storing the second layer parameter data by replacing the first layer parameter data with the second layer parameter data, processing the first layer output data using the stored second layer parameter data to form second layer output data; and storing the second layer output data.

20 Claims, 6 Drawing Sheets

(56) References Cited

OTHER PUBLICATIONS

European search report for EP21205467 that claims priority to the same parent application as the instant application; dated Mar. 25, 2022; 12 pages.

Hidayetoglu et al.: "At-Scale Sparse Deep Neural Network Interference with Efficient GPU Implementation", arxiv. orig, Cornell University Librarym, 201 Olin Library Cornell Unviersity Ithaca, NY 14853, Sep. 3, 2020, 7 pages.

Miao et al: "Enabling Large Neural Networks on Tiny Microcontrollers with Swapping", arxiv. org, Cornell University Library, 201 Olin Library Cornell University Ithaca, NY 14853, Sep. 1, 2021, 14 pages.

Uhlich Stefan: "Audio Source Separation and NNabla", 2020 IEEE International Conference on Acoustics, Speech, and Signal Processing: proceedings: May 4-8, 2020, Centre de Convencions Internacional de Barcelona (CCIB), Barcelona Spain. https://www.sony.com/en/SonyInfo/sony_ai/icassp2020/, 2 pages.

S. Uhlich, in "Audio Source Separation and Nnabla" at the 2020 International Conference on Acoustics, Speech, and Signal Processing, https://www.sony.com/en/SonyInfo/sony_ai/icassp2020/, 14 pages.

Hayakawa et al.; Neural Network Libraries: A Deep Learning Framework Designed from Engineers' Perspectives; https://github.com/sony/nnabla, Feb. 12, 2021; 12 pages.

Heaton, J. Goodfellow, I. Bengio, Y. and Courville A. "Deep Learning", 2018, https://www.deeplearningbook.org/ 3 pages.

\* cited by examiner

PARTIAL INFERENCE FRAMEWORK FOR SEQUENTIAL DNN PROCESSING ON CONSTRAINED DEVICES, AND ACOUSTIC SCENE CLASSIFICATION USING SAID PARTIAL INFERENCE FRAMEWORK

CROSS-REFERENCE TO RELATED APPLICATION

This application claims the benefit and priority of Denmark Patent Application No. PA 2020 01221 filed Oct. 29, 2020 in Denmark. The entire disclosure of the above application is incorporated herein by reference.

TECHNICAL FIELD OF THE INVENTION

The present invention relates to a method and processing device for performing partial inference on input data using a neural network comprising at least two layers, and a computer program product. Specifically, the present invention relates to performing Acoustic Scene Classification (ASC) using said method for performing partial inference.

BACKGROUND OF THE INVENTION

In the field of data processing, neural networks, and particularly deep neural networks (DNNs), have proven to be well suited to extract high level features from a signal or perform sophisticated data processing tasks, such as separating a mixed audio signal based on the audio sources, transcribing speech in an audio signal, recognizing people or objects in an image and removing noise from a recorded audio signal. A neural network comprises one or more neural network layers wherein each layer comprises a plurality of nodes with connections to a subsequent layer. Each node is associated with an activation function which dictates how the node should transmit data to any subsequent nodes to which it is connected. The activation function is commonly a non-linear activation function which is described using one or more parameters wherein the parameters are determined during a training process to allow the neural network to learn to perform a desired task. Once the parameters have been determined by training with a training data set, the neural network can operate in inference mode and perform inference on new data.

In general, a neural network requires several subsequent layers to extract higher level and more descriptive features of the input data and in many data processing applications ten or more neural network layers are not uncommon. With a large number of layers, wherein each layer comprises a plurality of nodes each associated with one or more parameters, devices need to have adequate memory to implement such deep neural networks. Many devices employ dedicated hardware such as Graphics Processing Units (GPUs) or Tensor Processing Units (TPUs) to specifically enable processing with deep neural networks. Compared to Central Processing Units (CPUs) the use of GPUs or TPUs enables faster and more efficient training using deep neural networks which at least in part is due to GPUs and TPUs offering the advantage of additional high-speed memory.

However, due to constraints relating to power, cost and/or circuit-footprint, many devices do not feature dedicated hardware for realizing deep neural networks and particularly edge-devices often feature severely limited memory capabilities (commonly in the order of 100 kilobytes), which is unsuitable for the implementation of deep neural networks. An edge device may be a device where local processing takes place directly, and which optionally conveys data to and from a local network to a central server and/or cloud server. For instance, the edge-device may be configured to communicate with one or more IoT or legacy devices (e.g. a monitoring device) using a plurality of different communication protocols and convey information from the IoT or legacy devices to a remote server for further processing. Additionally, the central server may convey data (such as operating instructions) to the edge-device or the IoT/legacy devices communicating with the edge-device. It is understood that the edge-device may communicate directly or indirectly (e.g. over a network) with the central server and that the edge-device may comprise a monitoring device. The central server, edge-device and further IoT devices may form a mesh network employing a light-weight messaging scheme with constrained bandwidth.

SUMMARY OF THE INVENTION

Despite the solutions discussed in the above, there is a need for an improved processing method and processing device for performing inference on data using a neural network on constrained edge devices.

According to a first aspect of the invention a method is provided for performing inference on input data using a neural network, wherein the neural network comprises at least two layers, a first layer and a subsequent second layer. The method comprises the steps of obtaining input data, storing the input data in a data storage arrangement, obtaining parameter data indicating the parameters of the first layer, storing the parameter data of the first layer in a parameter data storage location of the data storage arrangement, processing the input data using the stored first layer parameter data, to form first layer output data. The method further comprises storing the first layer output data in the data storage arrangement, obtaining parameter data indicating the parameters of the second layer and storing the second layer parameter data by replacing the first layer parameter data with the second layer parameter data in the parameter data storage location, processing the first layer output data using the stored second layer parameter data to form second layer output data and storing the second layer output data in the data storage arrangement.

It is understood that the second layer output data has been processed by the first and second layer of the neural network and may constitute the inferred final output data. That is, the input data is the input of the first layer and the first layer output data is used as input data to the second layer which in turn outputs second layer output data. For example, the second layer output data may be one or more features extracted from the input data by the neural network with at least two layers. The data passed between the first and second layer, i.e. the first layer output data, may be a hidden intermediate state or latent representation.

With the term replacing it is meant at least partially replacing. For instance, the next (e.g. second) layer parameter data which replaces the previous (e.g. first) layer parameter data may not require as much storage space as the previous layer parameter data whereby only a portion of the previous layer parameter data is replaced with the next layer parameter data. Replacing may comprise releasing the memory holding the previous layer parameter data and allocating/reallocating at least a portion of the released memory to the next layer parameter data.

The invention is at least partly based on the understanding that the parameters of a neural network put the highest requirements on the needed amount of memory. Regardless of the type of neural network the parameters may comprise biases, weights and/or state information for each node which requires a large amount of memory. By sequentially obtaining and storing only the parameters of one layer at a time and processing the input data with the currently stored layer the parameters of the layer can be discarded to make room for the parameters of a next layer after the data has passed the layer. Accordingly, a neural network may be employed as an iterative layer-by-layer process which uses less on-board memory to enable sophisticated and deep neural networks with many layers to be used while simultaneously allowing for more memory to be allocated to other system tasks. The present invention further enables the edge-devices to be constrained devices which are not purposely built for neural networks by alleviating the memory requirements for performing neural network inference. Accordingly, already existing devices with limited memory do not need to be upgraded with e.g. the addition of a GPU or TPU as the present invention allows devices with limited memory and processing capacity to employ neural networks with an arbitrary number of layers.

In some implementations, the on-board memory for parameter storage may be as small as the memory required to store the parameters of the largest layer of the at least two layers, wherein the largest layer denotes the layer which has parameters that requires the most data storage space. For instance, the present invention is well suited for computations with relaxed latency constrains in implementations wherein computation time is secondary and wherein memory and/or bandwidth is limited.

Prior solutions, such as the Nnabla processing scheme as described by S. Uhlich in "Audio Source Separation and Nnabla" at the 2020 International Conference on Acoustics, Speech, and Signal Processing, involves swapping-in and swapping-out training examples from a GPU memory to enable parallelism during training of a neural network. As indicated in the above the Nnabla processing scheme is very different from the present invention as the present invention involves replacing parameter data prior to propagating through each layer in an inference context for constrained devices as opposed to swapping-in and swapping-out batches of training data when training high-performance GPU or TPU devices. For the Nnabla implementation data is swapped in and out due to the required memory for parallel training exceeding that of multiple high-performance GPU devices whereas the present invention is architecture agnostic and can be implemented on general purpose processing devices which do not comprise a dedicated GPU or TPU, such as a simple Digital Signal Processor, DSP.

In some implementations, storing the input data in the data storage arrangement comprises storing the input data in a first data storage location of the data storage arrangement, storing the first layer output data in the data storage arrangement comprises storing the first layer output data in a second storage location of the data storage arrangement, and wherein storing the second layer output data in the data storage arrangement comprises by replacing the input data in the first data storage location with the second layer output data.

Replacing the input data with the second layer output data means at least partially replacing the input data with the second layer parameter data. That is replacing in the context of input/output data is defined analogously to replacing in the context of layer parameter data.

Accordingly, the storage volume of the data storage arrangement may be further reduced as input data and output data is moved between the first and second data storage location. For instance, the first and/or second data storage location which stores the data which is input and output from each layer may feature a storage capacity as small as the memory required to store the largest input/output data of the at least two layers, wherein largest again denotes the input/output data which requires the most storage space.

In some implementations, the parameter data of the at least two neural network layers is obtained by receiving the parameter data from an external device over a light-weight messaging scheme.

Accordingly, the device implementing the method may be realized by an edge-device operating with a light-weight messaging scheme in e.g. an IoT context. The light-weight messaging scheme may be a wireless mesh network and realized as a ZigBee-network, LoRa-network, Wi-Fi-network or a Bluetooth-network (e.g. a BLE-network). The light-weight messaging scheme may be a low bandwidth messaging-scheme wherein the bandwidth is equal to or below 5 megabits per second, 2 megabits per second or 1 megabit per second. Alternatively, the bandwidth may be below or equal to 500 kilobits per second, 250 kilobits per second, 100 kilobits per second, 50 kilobits per second or 25 kilobits per second. These bandwidths are merely exemplary and other maximum bandwidths are possible, however it is noted that the method may operate with constrained bitrates of 500 kilobits per second or less.

In some implementations, obtaining input data comprises performing a measurement using a sensor device to obtain measurement data, wherein the input data is based on the measurement data.

For example the input data may be acquired by measuring a physical parameter (e.g. by recording a sound or capturing an image) wherein the input data is equal to the measurement data or a representation of the measurement data. For instance, the measurement data is provided directly to the neural network as input data, or the measurement data is pre-processed to form a representation of the measurement data which is provided to the neural network. To enable a neural network with smaller dimensions the pre-processing may convert the measurement data to input data wherein the input data has a smaller dimension matching that of the first layer in the neural network.

In one exemplary implementation the edge-device comprises a camera which captures an image of a stationary car and the neural network is configured to extract a feature of interest from the image, such as the car brand and/or car model. An extracted feature in this scenario may be represented with a data string which is transmitted over a light-weight messaging scheme to e.g. a remote server for storage and/or further processing. A string representing the car brand or car model may be described using tens of bytes which is easily transmitted over the light-weight messaging scheme whereas the captured image may require several Megabytes of storage which is ill suited to transmit over the light-weight messaging scheme.

In some implementations, the sensor device comprises a microphone and the measurement data is an audio signal recorded by the microphone, wherein the neural network is trained to output a predicted acoustic scene classification given input data based on a recorded audio signal.

With input data that is based on a recorded audio signal it is meant that the input data may be equal to the recorded audio signal or a representation thereof. For instance, the processed version of the recorded audio signal may be a transform of the audio signal into a frequency or feature domain. Alternatively, the audio signal representation may be a decimated, interpolated or cropped version of the audio signal. Accordingly, the neural network may be employed by a pair of headphones or earphones performing active noise cancellation wherein the (type of) active noise cancellation is based on the predicted acoustic scene. To this end, the method may comprise determining the type of active noise cancellation based on the predicted acoustic scene and implementing the determined type of active noise cancellation e.g. in a pair of headphones or earphones which optionally renders a desired audio signal. The acoustic scene classification may be performed by employing the probabilistic model and optionally by considering sensor data as discussed in the below.

As the above example illustrates, it may be preferable to perform neural network analysis on edge devices which communicate over a light-weight messaging scheme as the neural network may compress the raw measurement data into features which are represented using less data.

In some implementations, at least one of the at least two layers is a Recurrent Neural Network, RNN, layer. For instance, the RNN layer is a Long Short-Term Memory, LSTM, layer or a Gated Recurrent Unit, GRU, layer. For instance, the convolutional layer may be a spatially separable convolutional layer or depth-wise separable convolutional layer wherein the separate parts of the convolutional layers are implemented as separate layers which further reduces the required memory for the parameters of each layer.

Accordingly, the parameter data associated with the at least one RNN layer may comprise state information (e.g. memory state information) of the RNN layer.

In some implementations, the neural network further comprises a third layer subsequent to the second layer and the method further comprises obtaining parameter data indicating the parameters of the third layer and storing the third layer parameter data by replacing the second layer parameter data with the third layer parameter data in the parameter data storage location. Additionally, the method comprises processing the second layer output data with the third layer using the stored third layer parameter data to form third layer output data and storing the third layer output data in the data storage arrangement.

Additionally, the third layer output data may be stored by replacing the second layer output data in the second data storage location of the data storage arrangement with the third layer output data.

Analogously, these steps may be repeated an arbitrary number of times to process the input data with a neural network with an arbitrary number of layers exceeding two or three layers, e.g., the neural network may comprise three, four, five, ten, hundreds or more layers. However, due to the replacing of the parameter data for each layer the parameter data storage volume does not need to be greater than required to store the parameter data of the largest layer regardless of the number of layers.

In some implementations, the method further comprises obtaining parameter data indicating the parameters of the first layer of a second neural network and storing the first layer parameter data for the second neural network by replacing the second layer parameter data of the first neural network with the first layer parameter data for the second neural network in the parameter data storage location, processing the second layer output data of the first neural network with the first layer of the second neural network using the stored first layer parameter data of the second neural network to form first layer second neural network output data and storing the first layer output data of the second neural network in the data storage arrangement.

Additionally, the first layer output data of the second neural network may be stored by replacing the second layer output data of the first neural network in the second data storage location of the data storage arrangement with the first layer second neural network output data.

That is, more than one neural network may be used in sequence to process the input data wherein the output data of the first neural network is provided as an input to the second neural network. For instance, the first neural network may extract a set of general features wherein the second neural network is selected based on the general features to extract more specific features. To continue the above example of the neural network being used to establish the car brand and car model the first neural network may determine that the brand of the car wherein, based on the determined car brand, a second neural network adapted to determine the car model of the particular brand is loaded as the second neural network to determine the car model.

In some implementations, the method is performed by a first device and wherein the method further comprises transmitting the second layer output data to a second device. For instance, the second layer output data may be transmitted to the second device using the same light-weight messaging scheme employed to obtain the parameter data.

Additionally or alternatively, the parameter data is received partially from a first external device and partially from a second external device and/or the second layer output data is transmitted partially to a first external and partially to a second external device. That is, the parameter data and output data may be conveyed over different communication routes through the network. Similarly, the method may be performed with one device or a first set of devices communicating with each other (using e.g. the light-weight messaging scheme) which enables sharing of data processing means and/or data storage between the devices so as to form a distributed processing scheme and/or storage scheme. In such implementations, the parameter data may be received from a second external device or a second set of external devices communicating with the first set of devices and the output data may be transmitted to the second external device or set of external devices. Alternatively, the output data may be transmitted to a third external device or third set of external devices different from the second external device or set of external devices.

According to a second aspect of the invention there is provided a processing device for performing inference on input data using a neural network. The processing device comprises a receiver (configured to receive data associated with the parameters of each layer of a neural network comprising at least two layers), a processing unit (configured to apply each layer of the neural network), a data storage arrangement storing input data, and a controller. The controller is configured to control the receiver to receive first layer parameter data indicative of the parameters of a first layer of the at least two layers and store the first layer parameter data in a parameter data storage location of the data storage arrangement, control the processing unit to process input data in the data storage arrangement with the first layer parameter data stored in the parameter data storage location to form first layer output data which is stored in the data storage arrangement, control the receiver to receive second layer parameter data indicative of the a second layer parameter data and store the second layer parameter data in the data storage arrangement by replacing the first layer parameter data, and control the processing unit to process the first layer output data with the second layer using the second layer parameter data stored in the data storage arrangement to form second layer output data, which is stored in the data storage arrangement.

As the parameter data is replaced the processing device may be realized with less memory. In some implementations of the second aspect the input data is obtained using the receiver (e.g. transmitted from a second device) or the input data is measured by a measurement device of the processing device.

In some implementations of the second aspect of the invention the data storage arrangement further comprises a first and a second data storage location, wherein the input data is stored in the first data storage location of the data storage arrangement and wherein the first layer output data is stored in the second storage location, and wherein the second layer output data is stored in the first data storage location by replacing the input data with the second layer output data. As the input and output data is replaced the required amount of storage space decreases further.

In some implementations, each layer is associated with a parameter data volume indicating the storage volume required to store the parameter data of the layer, wherein the parameter data storage location has a storage volume equal to the largest parameter data volume.

The parameter data storage location may be sized to store the parameters of one layer at a time for reference by the processing unit. In some implementations, the parameter data storage location and a general data storage location are implemented by a same general data storage module comprising a parameter data storage partition which is configured to store the parameter data of one layer at a time wherein the general data storage location comprises a shared or individual partition for input data storage (a first data storage location) and an output data storage. Alternatively, the input data, output data and parameter data are stored in individual data storage units which together constitute the data storage arrangement or the parameter data is stored in a parameter data storage unit and the input as well as output data is stored in a separate general data storage unit whereby the data storage arrangement is formed by two storage units.

For instance, the parameter data storage location (or equivalently the parameter data storage unit) may have a storage volume below 100 kilobytes, allowing for layers requiring a storage volume of 100 kilobytes or less. Alternatively, the parameter data storage location may have a storage volume equal to or less than 50 kilobytes or 25 kilobytes.

These storage volumes are merely exemplary, and the parameter storage volume may have a storage volume equal to or less than 5 megabytes, 2 megabytes, 1 megabyte, 500 kilobytes or even a storage volume equal to or less than 100 kilobytes, 50 kilobytes or 15 kilobytes.

In some implementations, the data storage arrangement comprises a general data storage location, wherein the general data storage location is configured to store the input and output data. The general data storage location may have a storage volume no greater than 50 kilobytes. For instance, half of the general data storage location storage space may be allocated for the input data (which may be subsequently replaced by the second, fourth, sixth etc. layer output data) and half is allocated for the first layer output data (which may be subsequently replaced by the optional third, fifth, seventh etc. layer output data). For instance, the first data storage location may be dimensioned after the largest one in terms of storage requirements of the input data and second layer output data (and optionally fourth, sixth etc. layer output data) and the second data storage location may be dimensioned after the largest one in terms of storage requirements of the first layer output data (and optionally third, fifth etc. layer output data).

Moreover, it is noted that any output data may be referred to as input data as the output data is used as input to a subsequent layer. For instance, the first layer output data may be referred to as second layer input data, the second layer output data may be referred to as third layer input data and so forth.

In some implementations, the processing device further comprises a wireless transmitter configured to transmit the second layer output data to a second device. For instance, the processing device may be implemented as an IoT edge-device.

According to a third aspect of the invention there is provided a computer program product comprising instructions which, when executed by a processor, performs the method according to the first aspect.

The invention according to the second and third aspect features the same or equivalent benefits as the invention according to the first aspect. Any functions described in relation to the method, may have corresponding features in a system or device.

BRIEF DESCRIPTION OF THE DRAWINGS

These and other aspects of the invention will now be described in more detail, with reference to the appended drawings showing exemplary embodiments of the present invention, wherein.

DETAILED DESCRIPTION OF CURRENTLY PREFERRED EMBODIMENTS

Figure 1:
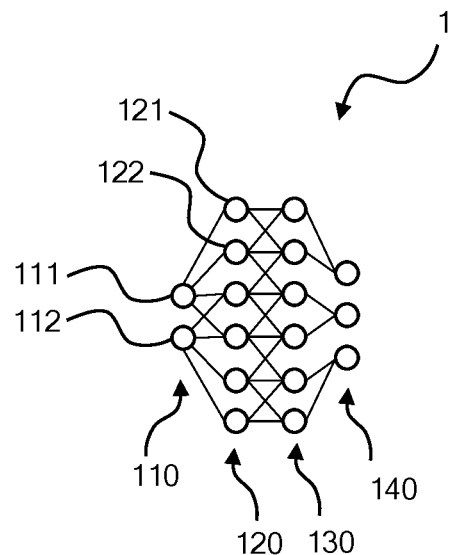
FIG. 1 schematically depicts a neural network with four neural network layers.

With reference to FIG. 1 there is illustrated a neural network 1 comprising a plurality of layers 110, 120, 130, 140 wherein each layer comprises at least one node 111, 112, 121, 122. Each node 111, 112, 121, 122 is associated with at least one parameter and is connected to at least one node of a subsequent layer. For instance, the node 111 of the first layer 110 is connected to the nodes 121, 122 of the second layer 120. In a training mode, the parameters of each node are determined such that the neural network 1 learns to extract the desired information from the input data provided to the first layer 110. In the training mode the neural network 1 may be initialized with a random set of parameters for each node and a set of training data is provided to the neural network which provides an output for each instance of inputted training data passed through the neural network 1. By employing a loss function, such as a function proportional to the difference between each output and a desired and/or true output, the parameter values of the nodes 111, 112, 121, 122 may be slightly adjusted after passing each training data instance through the neural network so as to reduce loss defined by the loss function. This is known to a person skilled in the art as backpropagation and the training process is continued until parameter values enabling a sufficiently small loss have been determined. Further general details of neural networks or the training of neural networks are known from the literature, see e.g. Heaton, J. Goodfellow, I. Bengio, Y. and Courville A. "Deep Learning", 2018.

When the parameter values have been determined, the neural network 1 may operate in inference mode wherein input data, which is not present in the training data, is provided to the first layer 110 and processed to generate first layer output data, which is passed on to the second layer 120 which processes the first layer output data to generate second layer output data, which is provided to the third layer 130 and so forth, until the final layer 140 outputs final output data which may indicate a feature extracted from the input data or a processed version of the input data. Each layer 110, 120, 130, 140 of the neural network 1 may comprise a different number of nodes and/or parameters from the other layers in the neural network 1. Furthermore, any type of neural network layer is possible to be used with the present invention such as convolutional layers, transposed convolutional layers, recurrent neural network layers such as LSTM layers and GRU layers. The neural network layers may be of an arbitrary dimension and accordingly the data passed between the layers may change dimensionality. For instance, two-dimensional image data may be converted to a single value indicating true or false relating to a person being detected in the image when passed through the neural network.

Figure 2:
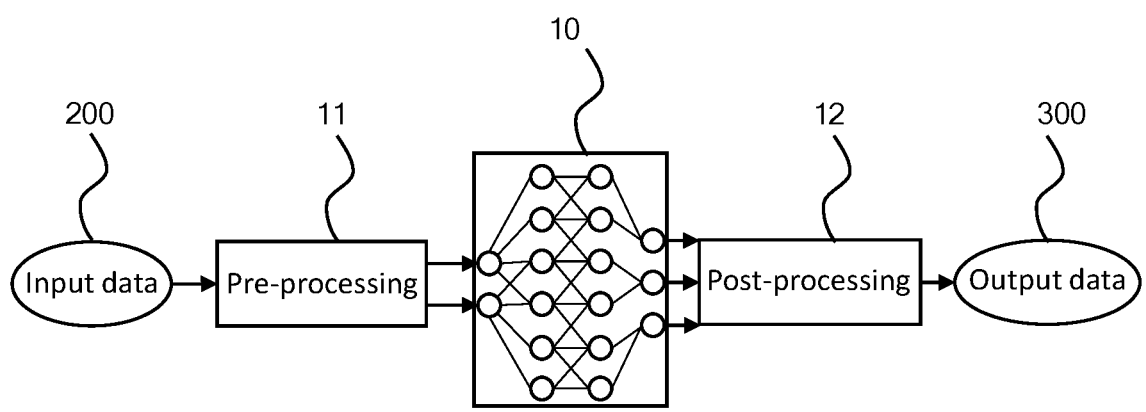
FIG. 2 depicts a data processing stream as employed in embodiments of the present invention which includes data processing with a neural network layer.

With reference to FIG. 2 there is illustrated a processing chain (e.g. an audio, image or data processing chain) for obtaining output data 300 from the input data 200 using a neural network processing unit 10 which employs a neural network. Optionally, the input data 200 is subject to pre-processing using a pre-processing unit 11 which extracts a representation of the input data which is provided to the neural network processing unit 10. That is, it may be the representation of the input data which is stored in the first data storage location and the pre-processing unit 11 is adapted to perform a processing which converts the input data into an input data representation which matches the dimensions of the first layer of the neural network.

Similarly, the data output by the neural network processing unit 10 is subject to post-processing with a post-processing unit 12 wherein the output data 300 is a post-processed form the data outputted by the final layer of the neural network employed by neural network processing unit 10. If the input data 200 is an audio signal the pre-processing unit 11 may perform a linear transformation of the signal in the frequency domain or transform the audio signal to a frequency or feature representation which is provided to the neural network processing unit 10 which applies the neural network. For example, the input data 200 may be an audio signal and the pre-processing unit 11 interpolates the audio signal, decimates the audio signal or extracts a set of audio signal features, a power spectrum, a Mel spectrum and/or Mel-frequency cepstral coefficients of the audio signal to form a representation of the audio signal which is provided as input to the neural network processing unit 10. Accordingly, as the neural network operates using features as opposed to the raw audio signal as such the size of the neural network can be decreased.

Optionally, the input data 200 may be provided without pre-processing to the neural network processing unit 10. For instance, the input data 200 may be an image formed represented by an N×N matrix of values wherein each value may be a scalar (e.g. to represent a grayscale image) or a vector (e.g. with three values to represent an RGB color image) which is provided directly to the neural network processing unit 10. To this end, the first layer of the neural network implemented by the neural network processing unit 10 may have a dimension matching that of the image data. Optionally, the image data is decimated or transformed into a simpler representation which is provided to the neural network. Accordingly, the size of the neural network can be decreased.

Similarly, the post-processing unit 12 may for example perform a transformation or inverse-transformation to recreate a signal which has been processed in a frequency domain. Alternatively, the post-processing unit 12 may perform an averaging or robustness function taking into account prior output data to avoid and/or mitigate undesired rapid fluctuations in e.g. an acoustic scene classification implementation as described in the below.

Figure 3A:
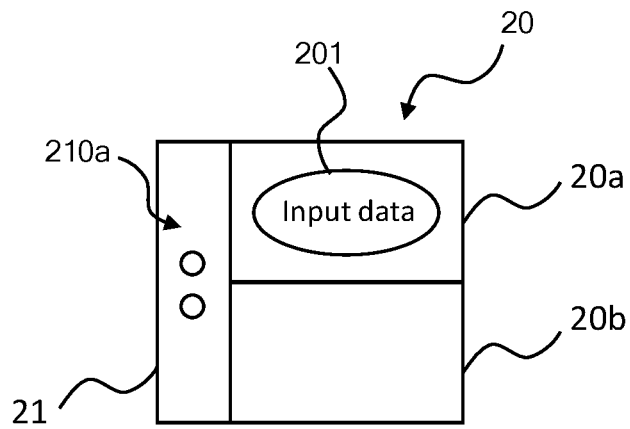
FIG. 3a illustrates a data storage arrangement according to one embodiment of the present invention.

FIG. 3*a* illustrates a data storage arrangement 20. The data storage arrangement 20 comprises one or several, in the illustrated case three, physical data storage locations. The data storage arrangement 20 comprises one data storage location allocated to storage of parameter data 210*a*, the parameter data storage location 21, one data storage location allocated for the input data 201, the first data storage location 20*a*, and one data storage location allocated for the output data, the second data storage location 20*b*. The parameter data storage location 21 stores data 210*a* indicative of the parameters of a neural network layer, for instance the parameter data storage location 21 stores data indicative of the parameters for the nodes of a first neural network layer.

The three data storage locations 20*a*, 20*b*, 21 may be provided as individual data storage units or as a single general data storage unit with allocated storage partitions corresponding to the respective locations. As a further example, the parameter data storage location 21 may be implemented in a storage unit separate from the storage unit of the first and second data storage location 20*a*, 20*b* wherein the first and second data storage location 20*a*, 20*b* are provided as two partitions of a same general data storage unit. The storage volume of the first and second data storage location (partition) 20*a*, 20*b* may be equal or different from each other. The storage volume of the first and second data storage location (partition) 20*a*, 20*b* is adapted to store the input data and any subsequent output data resulting from processing with the neural network. In one implementation, the parameter data storage location 21 has a storage volume of less than 15 kilobytes and the first and second data storage location 20*a*, 20*b* have a storage volume of less than 25 kilobytes each meaning that the data storage arrangement 20 has a storage capacity of less than 65 kilobytes.

Figure 4:
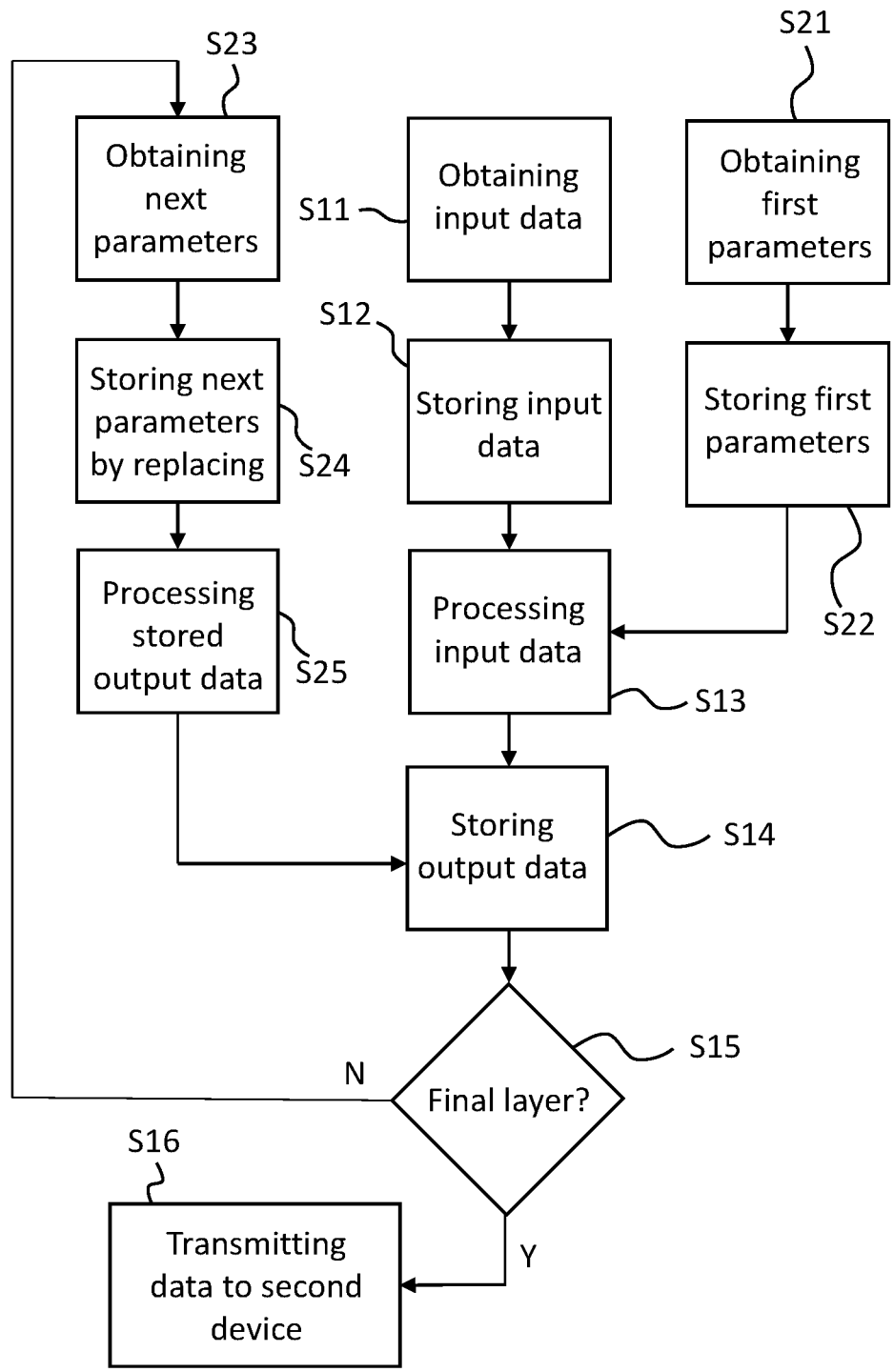
FIG. 4 is a flowchart illustrating a method according to an embodiment of the present invention.

With further reference to FIG. 4 there is depicted a flowchart illustrating a method according to some implementations of the invention. At S11 input data 201 to be processed with a neural network is obtained and the input data 201 is stored in the first data storage location 20a at S12. At S21 first layer parameter data 210a is obtained and at S22 the first layer parameter data 210a is stored in a parameter data storage location 21. It is understood that steps S21 and S22 may be performed prior to, after or simultaneously as step S11 and S12. For instance, it may be preferable to have the first layer parameter data 210a stored when the input data 201 is obtained or vice versa. After step S11, S12, S21 and S22 the setup in FIG. 3a is obtained with the parameter data 210a and input data 201 stored in a respective data storage location and the method then goes to step S13 comprising processing the input data 201 obtained at S11 with the first layer parameter data 210a obtained at S21 so as to generate first layer output data which is stored in the second data storage location 20b at step S14.

Figure 3B:
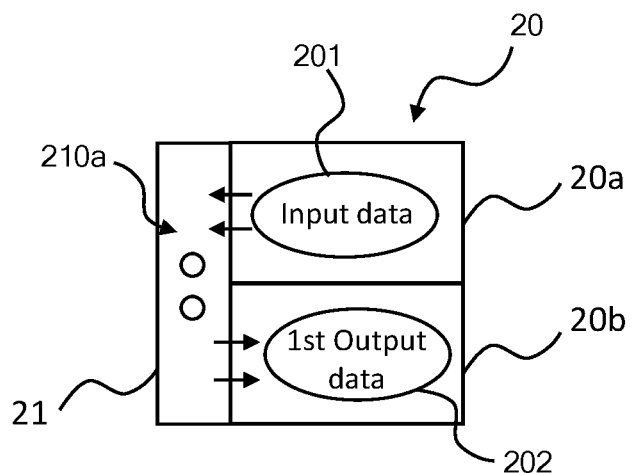
FIG. 3b illustrates the data flow in the data storage arrangement during a first phase of performing inference according to embodiments of the present invention.

Step S13 is further illustrated in FIG. 3b showing how data is transferred between the first and second data storage location 20a, 20b. The input data 201 is processed using the first layer parameter data 210a in the parameter data storage location 21 to generate first layer output data 202 which is stored in the second data storage location 20b. As indicated in the above, the first layer output data 202 may be referred to as second layer input data as this data is the input of the second layer and output of the first layer. After this process the parameter data 210a of the first neural network layer may be removed. Alternatively, the parameter data 210a in the parameter data storage location 21 is removed later during the replacement in step S25.

Turning back to the method in FIG. 4, it is determined at step S15 whether the layer which was used to obtain the output data 202 at S14 was the final layer of the neural network. If it was the final layer the method may end with the output data 202 stored in the second data storage location 20b. Optionally, if it was the final layer the method may go to step S16 comprising transmitting the output data 202 to a second device. If it is determined at S15 that the layer used to obtain the output data 202 stored at S14 was not the final layer the method may iterate again starting with step S23.

At S23 the next (e.g. second) layer parameter data 210b is received which is stored at S24 by replacing the first layer parameter data 210a obtained and stored at S21 and S22. With the next (second) layer parameter data 210b and the first layer output data 202 stored the method goes to step S25 comprising processing output data 202 stored at S14 (e.g. the first layer output data) with the next layer using the stored next layer parameter data 210b to form next layer (second layer) output data 203 which is stored at the first data storage location 20a by replacing the input data at S14. The output data 203 may be second layer output data which may be referred to as third layer input data as this data is the output of the second layer and may be the input data of an (optional) third layer.

Figure 3C:
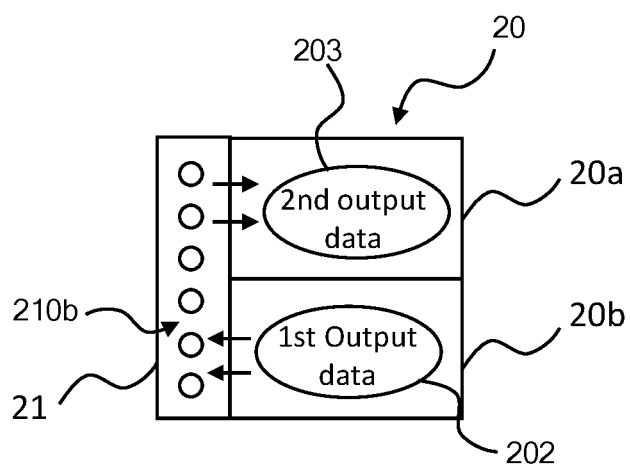
FIG. 3c illustrates the data flow in the data storage arrangement during a second phase of performing inference according to embodiments of the present invention.

Step S25 is further illustrated in FIG. 3c which shows how data is transferred between the first and second data storage location 20a, 20b. Once the parameter data 210b of the next (second) neural network layer has been received and stored in the parameter data storage location 21, replacing the first layer parameters 210a, the first layer output data 202 stored in the second data storage location 20b is processed with the next neural network layer to generate next layer output data 203 which is stored in the first data storage location 20a by replacing the input data 201 which was previously stored in the first data storage location 20a.

After the next (second) layer has been used to process the output data 202 the method again arrives at step S15 involving determining whether the (e.g. second) layer which was used to obtain the data stored at S14 was the final layer of the neural network. If it is determined that this was the final layer the method may end or go to S16 and if it is determined that this was not the final layer the method iterates steps S23, S24 and S25 again for the next (e.g. third) layer until the final layer has been used to obtain the output data stored at S14.

Furthermore, it is noted that while the replacement process of the next output data and the input data described in FIG. 3b and FIG. 3c minimizes the amount of memory required for storage of the input data 201 and output data 202, 203 in the first and second data storage location 20a, 20b, some implementations feature a first and second data storage location 20a, 20b with enough storage space to store e.g. each instance of output data 202, 203 and input data 201 without needing to replace any data. Accordingly, steps S12 and S14 may involve storing data at new data storage location. However, the required size of the parameter data storage location 21 is still minimized by replacing the parameter data 210a for each layer.

Figure 5A:
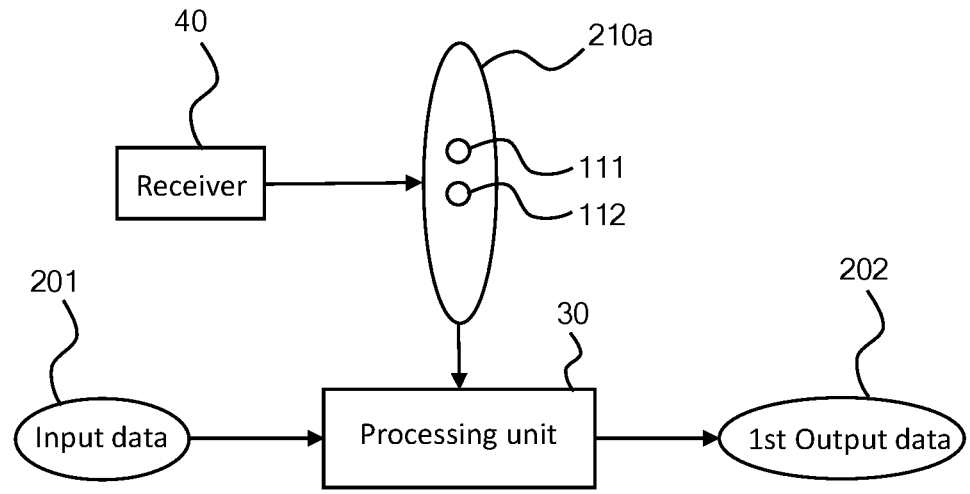
FIG. 5a illustrates a first phase of performing inference with a neural network according to embodiments of the present invention.

FIG. 5a illustrates a first phase of implementing the neural network from FIG. 1 for inference on a constrained device or edge-device comprising a processing unit 30 corresponding to steps S11, S12, S13, S14, S21, and S22 in FIG. 4. In the first phase, input data 201 is obtained and stored (in e.g. the first data storage location). The input data 201 may e.g. be measurement data obtained by a sensor of the constrained device or the input data 201 is received from an external device (wherein the external device may comprise a sensor which has obtained the data) using the receiver 40.

Additionally, the constrained device obtains parameter data 210a indicating the parameters of a first layer and stores the parameters in a parameter data storage location. As seen, the parameter data indicates the parameters of each node 111, 112 in the first layer. The parameter data 210a is received using a receiver 40 (e.g. a wireless receiver) which receives the parameter data 210a from a server or other external device over a light-weight messaging scheme such as a wireless mesh network. With the input data 201 and the first layer parameter data 210a the constrained device has access to sufficient information to pass the input data 201 through the first layer of the neural network. Optionally, the input data 201 is first processed to obtain a representation of the input data which is provided to the processing unit 30. Accordingly, the processing unit 30 processes the input data 201 by passing it through the first layer using the first layer parameter data 210a to obtain first layer output data 202. The first phase of FIG. 3a is concluded by the first layer output data 202 being stored in a data storage location (e.g. the second data storage location). Optionally, after having acquired the first layer output data 202 the input data 201 may be deleted to free enough storage space to continue processing in the second phase or the input data 201 may be replaced during the second phase.

Figure 5B:
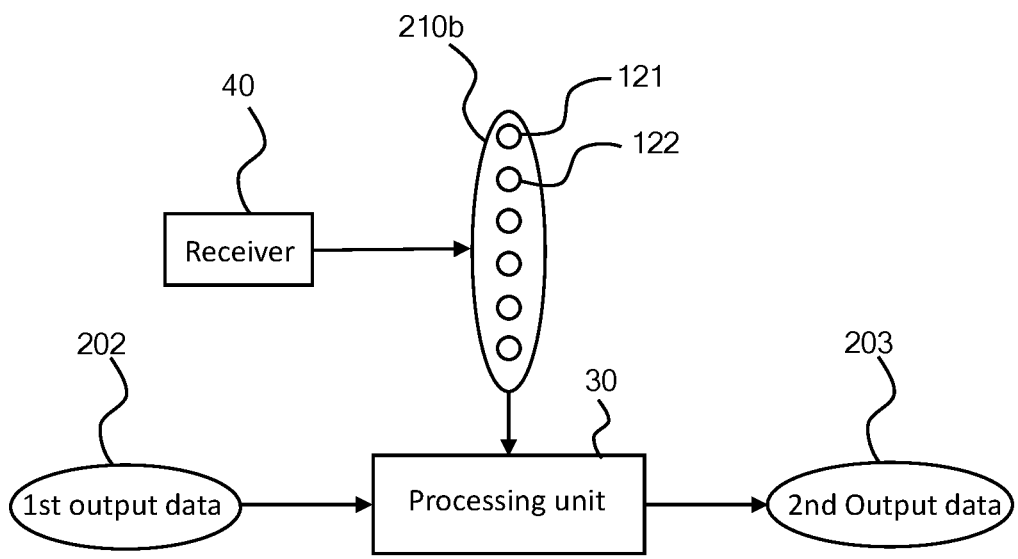
FIG. 5b illustrates a second phase of performing inference with a neural network according to embodiments of the present invention.

With further reference to FIG. 5b there is illustrated the second phase, subsequent to the first phase, of implementing a neural network on the constrained device corresponding to steps S23, S24 and S25 in FIG. 4. In the second phase parameter data 210b indicating the parameters of a second layer is obtained and stored by replacing the first layer parameter data 210a present in the parameter data storage location from the first phase. Accordingly, the parameter data storage location only needs to enable sufficient storage to store the largest of the first layer parameter data 210a and the second layer parameter data 210b. As seen, the second layer parameter data 210b may indicate the parameters associated with each node 121, 122 of the second layer of the neural network. With the first layer output data 202 and the second layer parameter data 210b the constrained device has access to sufficient information to pass the first layer output data 202 through the second layer of the neural network. Accordingly, the processing unit 30 processes the first layer output data 202 with the second layer by referencing the second layer parameter data 210b and passing the first layer output data 202 through the second layer to form second layer output data 203. The second layer output data 203 is stored in the first data storage location by replacing the (redundant) input data 201 which concludes the second phase of implementing the neural network on a constrained device.

By passing the output data 202, 203 of each layer between the first and second data storage location and replacing the parameter data 210a, 201b in the parameter data storage location the method may be iterated so as to employ a neural network of arbitrary length or employ a sequence of two or more neural networks wherein each neural network has an arbitrary number of layers. In some implementations, the selection of the second neural network is based on the final output of the first neural network. For instance, the final output of the first neural network is transmitted by the processing device to a second device and the second device selects a second neural network based on the final output data whereby the second device transits the parameter data of each layer of the second neural network to the processing device one at a time. The second device may be another node in a mesh network or a central server.

Figure 6:
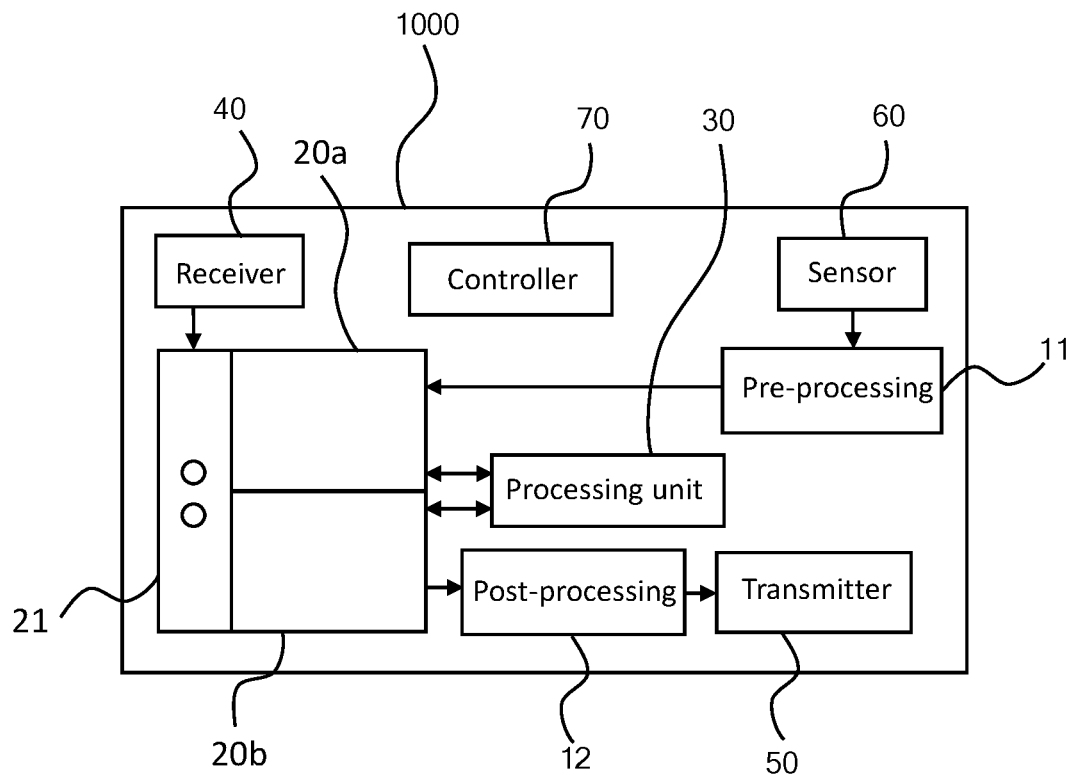
FIG. 6 depicts a processing device according to an embodiment of the present invention.

FIG. 6 depicts schematically a processing device 1000 according to some embodiments of the invention. The processing device 1000 comprises a processing unit 30 which processes data with a neural network one layer at a time. The processing device 1000 comprises a receiver 40 configured to receive parameter data indicative of the parameters of a layer of the neural network wherein the parameter data is stored in parameter data storage location 21 of the processing device 1000. The processing device may further comprise a sensor 60 configured to sense a physical parameter of the environment of the processing device 1000. The sensor 60 may be adapted to sense a parameter related to at least one of: a sound, a light intensity, a light wavelength (color), temperature, air pressure, motion, moisture and water flow. The sensor 60 may be a camera capturing an image or a biometric sensor such as a fingerprint reader. Optionally, the input data (e.g. the sensor data) is pre-processed in a pre-processing module 11 or by the processing unit 30 to obtain a representation of the input which data is stored in the first data storage location 20a of the data storage arrangement. In some implementations, the processing device 1000 does not comprise a sensor and the input data is received by the receiver 40 from an external device (such as another node in the mesh network or a remote server).

The processing unit 30 is configured to access the layer parameter data (indicative of the parameters of a single neural network layer) in the parameter data storage location 21 and process the input data (or representation thereof) in the first data storage location 20a so as to generate first layer output data which is stored in the second data storage location 20b. Subsequently, the parameter data indicative of the parameters of a next neural network layer are received at the receiver 40 and the parameter data is stored in the parameter data storage location 21 by replacing the parameter data of the previous neural network layer in the parameter data storage location 21. The processing unit 30 can then access the parameter data of the second neural network layer and process the output data in the second data storage location 20b with the second layer so as to generate second layer output data which is stored in the first data storage location 20a by replacing the input data 201 stored therein or at another data storage location. In a similar fashion, the processing device 1000 may continue to operate to process data with a neural network comprising an arbitrary number of layers whereby the final output data is stored in either the first or second data storage location 20a, 20b or another data storage location of the data storage arrangement. The final output data may then be subject to post-processing with a post processing module 12 or the processing unit 30 and/or the final output data (with or without post-processing) may be transmitted using the transmitter 50 to a second device (such as another node in the mesh network or a remote server).

The processing device 1000 may comprise a dedicated controller 70 configured to control each of: the data storage arrangement 20a, 20b, 21, processing unit 30, receiver 40, transmitter 50, sensor 60, pre-processing module 11 and post-processing module 12 to perform the method as described in the above and in relation to FIG. 7 in the below. Alternatively, the controller is implemented by the processing unit 30.

Figure 7:
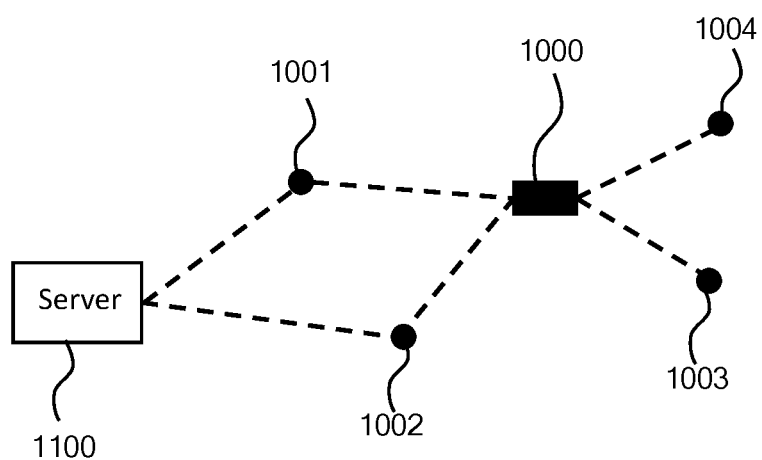
FIG. 7 depicts a processing device according operating in a light-weight messaging scheme according to an embodiment of the present invention.

FIG. 7 illustrates a processing device 1000 according to some embodiments of the invention operating in a lightweight messaging scheme together with other devices (nodes) 1001, 1002, 1003, 1004 forming a mesh network together with a central server 1100. For instance, the mesh network may be a BLE network, Wi-Fi network, LoRa network with a bandwidth between 0.3 and 22 kilobits per second (LoRa modulation) or up to 100 kilobits per second (GFSK modulation) or a ZigBee network with a bandwidth of up to 20 kilobits per second (for the 868 MHz band), up to 40 kilobits per second (for the 915 MHz band) or up to 250 kilobits per second (for the 2450 MHz band). It is understood that the processing device 1000 may itself constitute a node in the mesh network and that the input data and/or parameter data may be created (e.g. measured) by the processing device 1000 itself, obtained directly or indirectly (e.g. via one or more intermediate nodes in the mesh network) from another node 1001, 1002, 1003, 1004 in the network or obtained from the central server 1100. The second layer output data may be transmitted to a second device wherein the second device is the central server 1100 or another node 1001, 1002, 1003, 1004 in the mesh network. In some implementations, the processing device 1000 communicates with a legacy device 1003, 1004 using a first communication protocol and communicates with the mesh network comprising the central server 1100 and nodes 1001, 1002 using a second communication protocol. For instance, the processing device 1000 may be a gateway implementing some data processing using a neural network.

Figure 8:
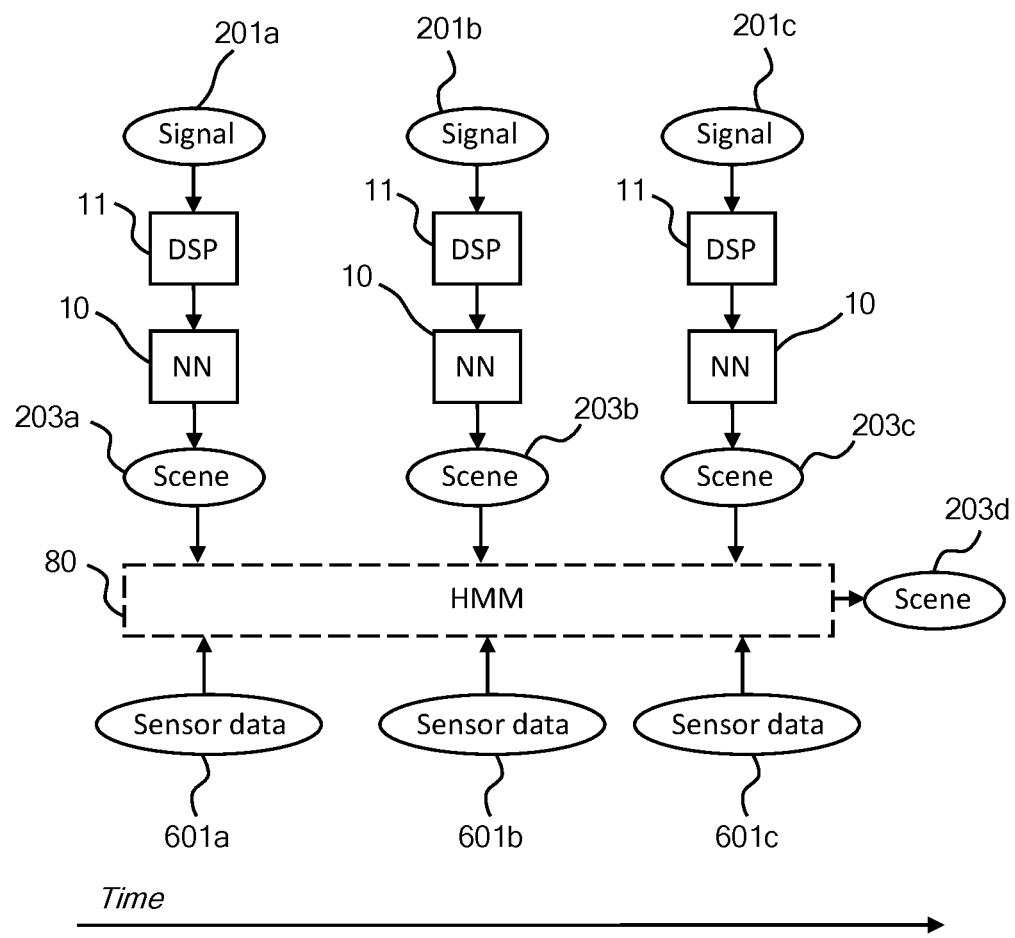
FIG. 8 depicts acoustic scene classification using a neural network and a probabilistic model according to some embodiments of the present invention.

According to a further additional aspect of the invention, a method is provided for performing Acoustic Scene Classification (ASC) using a neural network. This method is illustrated in FIG. 8 and may comprise the steps of obtaining (e.g. by recording) a plurality of subsequently recorded audio signal portions 201a, 201b, 201c and determining scene information 203a, 203b, 203c associated with each recorded audio signal portion 201a, 201b, 201c, wherein the scene information 203a, 203b, 203c is indicative of an acoustic scene in which the audio signal was recorded. The method further comprises employing a probabilistic model 80 on the plurality of subsequent acoustic scene information instances 203a, 203b, 203c to determine a predicted acoustic scene 203d of a next audio signal and determining a type of audio processing to be employed to audio data which is to be rendered based on the predicted acoustic scene 203d.

The acoustic scene information 203a, 203b, 203c may be determined by applying a neural network with the neural network processing unit 10. The neural network processing unit 10 may for example be implemented according to the method or with a processing device as described in the first and second aspect of the invention, accordingly the acoustic scene classification may be performed using partial inference with the neural network processing unit 10.

The acoustic scene may indicate that the acoustic scene is an indoor scene such as a library scene, office scene or home scene or a commute scene such as a bus scene, train scene or airplane scene. Accordingly, the scene information 203a, 203b, 203c, 203d may facilitate determining a tailored form of audio processing (such as noise cancellation) to be employed based on the acoustic scene of an audio device which employs the above method. The audio device may for instance be a pair of headphones or earphones employing active noise cancellation. In some implementations, each acoustic scene is associated with an audio processing type and the output of the neural network processing unit 10 is a sequence of scene information instances 203a, 203b, 203c and/or associated types of audio processing types or noise cancellation methods.

In some implementations, determining the acoustic scene information 203a, 203b, 203c for each audio signal of the plurality of subsequent audio signals comprises providing each audio signal portion 201a, 201b, 201c to a neural network 10 trained to predict the acoustic scene information 203a, 203b, 203c given an audio signal portion 201a, 201b, 201c. In addition, each audio signal portion 201a, 201b, 201c may be subject to pre-processing with a pre-processing unit 11 such as a Digital Signal Processor (DSP). The pre-processing performed by the pre-processing unit may for instance be cropping in the time domain or linear filtering in the frequency domain to obtain a reduced audio signal which is fed to the neural network. For instance, the audio signal portions 201a, 201b, 201c provided to the neural network processing unit 10 may be 10 seconds long or preferably the audio signal portions 201a, 201b, 201c are less than 5 seconds, such as 3.5 seconds long or 2.5 seconds long, to decrease the size of the input data of the neural network processing unit 10 which enables use of a smaller neural network in the neural network processing unit 10 with maintained accuracy.

In some implementations, the probabilistic model 80 is modeled with a Hidden Markov Model (HMM) which is designed to model the transition between acoustic scenes indicated by the acoustic scene information 203a, 203b, 203c. The probabilistic model 80 is used as post-processing which takes the acoustic scene information 203a, 203b, 203c and past audio signals 201a, 201b, 201c into consideration when predicting the acoustic scene information of a next audio signal portion 203d. One way of efficiently implementing a probabilistic model 80 is to model it with an HMM. Additionally or alternatively, sensor data instances 601a, 601b, 601c concurrent and associated with each audio signal portion 201a, 201b, 201c are obtained using one or more sensors (such as motion sensors) wherein the predicted acoustic scene information of the next audio signal portion 203d is further based on at least the sensor data 601c associated with the previous audio signal portion 201c. For instance, if the acoustic scene information 203a, 203b, 203c indicates an indoor scene for the previous audio signal portion(s) 201a, 201b, 201c and no motion is recorded it is likely that the acoustic scene information 203d of a next audio signal still indicates an indoor acoustic scene (i.e. the user has not moved to a new location and the acoustic scene is therefore likely the same). Similarly, if motion is detected the likelihood of the acoustic scene information changing its indicated acoustic scene 203a, 203b, 203c, 203d from one scene type to another increases.

To this end current acoustic scene information 203d as predicted by the neural network of the neural network processing unit 10 may be weighted in post-processing with respect to at least one of: the predicted acoustic scene information of the HMM (which is based on one or more of the previous instances of acoustic scene information 203a, 203b, 203c) and the sensor data 601a, 601b, 601c associated with at least one previous audio signal portion 201a, 201b, 201c (and optionally the current audio signal portion) when determining the acoustic scene information 203d of the current audio signal portion. Accordingly, as past acoustic scenes information 203a, 203b, 203c and/or sensor data 601a, 601b, 601c is taken into consideration the robustness and accuracy of acoustic scene classifier is enhanced which means that the correct type of audio processing is more likely to be employed at each point in time.

By applying a probabilistic model 80 on the output sequence of acoustic scene information 203a, 203b, 203c, the neural network of the neural network processing unit 10 may be smaller (comprise fewer layers) and/or less input data 201a, 201b, 201c may be provided to the neural network processing unit 10 while the scene classification accuracy is maintained or even enhanced in comparison to using a larger neural network in the neural network processing unit 10.

That is, the inventors have realized that one way of implementing a neural network on devices with little memory is to decrease the size of the input data 201a, 201b, 201c and/or the size of the neural network of the neural network processing unit 10 (which decreases the scene classification accuracy but lessens the memory requirements) and compensate with a probabilistic model 80 implemented in the post-processing which takes the acoustic scene information 203a, 203b, 203c of past audio signal portions 201a, 201b, 201c and/or associated sensor data 601a, 601b, 601c into account. Moreover, the inventors have realized that an efficient way of implementing the probabilistic model 80 is to model it with an HMM which utilizes past predicted acoustic scenes and employs a probabilistic model of how acoustic scenes evolve.

The person skilled in the art realizes that the present invention by no means is limited to the preferred embodiments described above. On the contrary, many modifications and variations are possible within the scope of the appended claims. For example, the receiver used for obtaining the parameter data may be the same receiver which is used to obtain the input data from an external device and/or a first neural network may comprise at least two layers whereas the second subsequent neural network also comprises at least two layers.

What is claimed is:

1. A method for performing inference on input data using a neural network, wherein said neural network comprises at least two neural network layers, a first neural network layer and a subsequent second neural network layer, the method comprising the steps of:

obtaining input data;
storing the input data in a data storage arrangement;
obtaining parameter data indicating the parameters of the first neural network layer;
storing the parameter data of the first layer in a parameter data storage location of the data storage arrangement;
processing said input data using the stored first layer parameter data, to form first layer output data;
storing said first layer output data in the data storage arrangement;
obtaining parameter data indicating the parameters of the second neural network layer and storing the second layer parameter data by replacing the first layer parameter data with the second layer parameter data in the parameter data storage location;
processing said first layer output data using the stored second layer parameter data to form second layer output data; and
storing said second layer output data in the data storage arrangement,
wherein the parameter data of said at least two neural network layers is obtained by receiving the parameter data from an external device over a light-weight messaging scheme.

2. The method according to claim 1, wherein storing the input data in the data storage arrangement comprises storing the input data in a first data storage location of the data storage arrangement, wherein storing said first layer output data in the data storage arrangement comprises storing the first layer output data in a second storage location of the data storage arrangement, and
wherein storing the second layer output data in the data storage arrangement comprises replacing the input data in the first data storage location with the second layer output data.

3. The method according to claim 1, wherein said light-weight messaging scheme has a bandwidth less than or equal to 1 megabit per second.

4. The method according to claim 1, wherein said light-weight messaging scheme has a bandwidth less than or equal to 500 kilobits per second.

5. The method according to 4, wherein said sensor device comprises a microphone and said measurement data is a recorded audio signal, and
wherein said neural network is trained to output a predicted acoustic scene information given input data based on a recorded audio signal, wherein said acoustic scene information is indicative of an acoustic scene of the recorded audio signal.

6. The method according to claim 1, wherein said light-weight messaging scheme has a bandwidth less than or equal to 250 kilobits per second.

7. The method according to claim 1, wherein obtaining input data comprises:
performing a measurement using a sensor device to obtain measurement data, wherein said input data is based on said measurement data.

8. The method according to claim 1, wherein said neural network further comprises a third neural network layer subsequent to said second neural network layer, and wherein said method further comprises:
obtaining parameter data indicating the parameters of the third neural network layer and storing the third layer parameter data by replacing the second layer parameter data with the third layer parameter data in the parameter data storage location;
processing said second layer output data with said third neural network layer using the stored third layer parameter data to form third layer output data; and
storing said third layer output data in the data storage arrangement.

9. The method according to claim 1, wherein said method further comprises:
obtaining parameter data indicating the parameters of the first neural network layer of a second neural network and storing the first layer parameter data of the second neural network by replacing the second layer parameter data of the first neural network with the first layer parameter data of the second neural network in the parameter data storage location;
processing said second layer output data of the first neural network with said first neural network layer of said second neural network using the stored first layer parameter data of the second neural network to form first layer output data of the second neural network output data; and
storing said first layer output data of the second neural network in the data storage arrangement.

10. The method according to claim 1, wherein said method is performed by a first device and wherein the method further comprises transmitting the second layer output data to a second device.

11. A non-transitory computer readable storage medium comprising instructions which, when executed by a processor, performs the method according to claim 1.

12. The method according to claim 1, wherein the light-weight messaging scheme is a wireless mesh network.

13. A processing device for performing inference on input data using a neural network, comprising:
a receiver, configured to receive data associated with the parameters of each neural network layer of a neural network comprising at least two layers over a light-weight messaging scheme from an external device,
a processing unit, configured to process input data by applying each neural network layer of said neural network,
a data storage arrangement storing input data, and
a controller configured to:
control the receiver to receive first layer parameter data indicative of the parameters of a first neural network layer of said at least two neural network layers over the light-weight messaging scheme from the external device and store the first layer parameter data in a parameter data storage location of the data storage arrangement,
control the processing unit to process input data in the data storage arrangement with the first layer parameter data to form first layer output data, which is stored in the data storage arrangement,
control the receiver to receive second layer parameter data indicative of the parameters of a second neural network layer of said at least two layers over the light-weight messaging scheme from the external device and store the second layer parameter data in the parameter data storage location by replacing the first layer parameter data, and
control the processing unit to process the first layer output data in the data storage arrangement with the second layer parameter data to form second layer output data, which is stored in the data storage arrangement.

14. The processing device according to claim 13, wherein said data storage arrangement further comprises a first and a second data storage location,
   wherein said input data is stored in the first data storage location of said data storage arrangement and wherein said first layer output data is stored in the second storage location, and
   wherein said second layer output data is stored in the first data storage location by replacing the input data with the second layer output data.

15. The processing device according to claim 13, wherein each neural network layer is associated with a parameter data volume indicating the storage volume required to store the parameter data of the layer, and
   wherein said parameter data storage location has a storage volume equal to the largest parameter data volume.

16. The processing device according to claim 13, wherein said parameter data storage location has a storage volume less than or equal to 100 kilobytes.

17. The processing device according to claim 13, wherein said parameter data storage location has a storage volume less than or equal to 50 kilobytes.

18. The processing device according to claim 13, wherein said parameter data storage location has a storage volume less than or equal to 25 kilobytes.

19. The processing device according to claim 13, further comprising a wireless transmitter configured to transmit the second layer output data to a second device.

20. The processing device according to claim 13, wherein the light-weight messaging scheme is a wireless mesh network.

* * * * *